United States Patent [19]

Keeffe

[11] 3,959,524

[45] May 25, 1976

[54] METAL HALIDE DISCHARGE LAMP HAVING HEAT REFLECTIVE COATING

[75] Inventor: William M. Keeffe, Rockport, Mass.

[73] Assignee: GTE Sylvania Incorporated, Danvers, Mass.

[22] Filed: Nov. 22, 1974

[21] Appl. No.: 526,182

Related U.S. Application Data

[62] Division of Ser. No. 454,390, March 25, 1974, Pat. No. 3,889,142.

[52] U.S. Cl.............................. 427/106; 427/287; 427/376
[51] Int. Cl.² .......................................... B05D 5/12
[58] Field of Search .......... 427/105, 106, 287, 376; 313/17, 27, 44, 47, 220, 221

[56] References Cited

UNITED STATES PATENTS

| 1,698,302 | 1/1929 | Goss | 427/106 |
|---|---|---|---|
| 2,128,270 | 8/1938 | Spanner et al. | 427/105 |
| 3,662,203 | 5/1972 | Kuhl et al. | 313/221 |

Primary Examiner—Ronald H. Smith
Assistant Examiner—Janyce A. Bell
Attorney, Agent, or Firm—James Theodosopoulos

[57] ABSTRACT

In a metal arc discharge lamp having a high silica glass arc tube, the arc tube ends are coated with a heat reflective coating from a suspension contaning zirconium dioxide and zirconium diboride, the ratio of the two being between about 30 to 1 and 250 to 1.

1 Claim, 1 Drawing Figure

U.S. Patent May 25, 1976 3,959,524
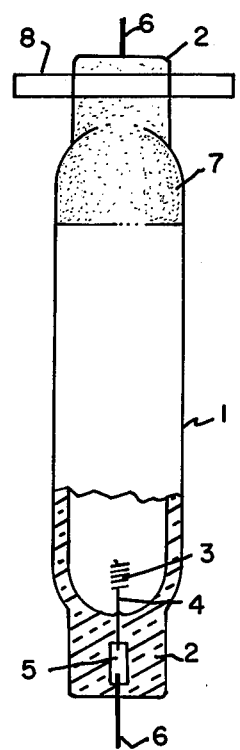

METAL HALIDE DISCHARGE LAMP HAVING HEAT REFLECTIVE COATING

This is a division, of application Ser. No. 454,397, filed Mar. 25, 1974, now U.S. Pat. No. 3,889,142.

THE INVENTION

This invention relates to metal halide arc discharge lamps. Such lamps comprise an arc tube, usually made of fused quartz or other high silica glass, having electrodes disposed therewithin and containing a fill including an inert starting gas, mercury and a metal halide.

The arc tube ends of such lamps usually have a heat reflective coating thereon in order to maintain said ends at a sufficiently high temperature so as to ensure adequate vapor pressure of the metal halides in the arc tube. Examples of such coatings are shown in U.S. Pat. Nos. 3,325,662 and 3,374,377, which disclose coatings of calcium pyrophosphate and zirconium dioxide.

One of the problems with prior art coatings is lack of adhesion to the arc tube. This problem is not severe when the arc tube is enclosed within an outer jacket. However, in unjacketed lamps, the rubbing-off of the coating can be detrimental to proper lamp operation.

This invention concerns zirconium dioxide heat-reflective coatings having improved adhesion and improved resistance to abrasion. I have found that a coating comprising $ZrO_2$ and $ZrB_2$, which has been fired at a suitably high temperature, yields said improvements.

The single FIGURE in the drawing is an elevational view, partly in section, of the arc tube of a metal halide discharge lamp in accordance with this invention.

The arc tube comprises a tubular quartz envelope 1 having press seals 2 at each end thereof. Disposed within envelope 1 is the usual fill including an inert starting gas, mercury and metal halide. An electrode 3 is disposed at each end of the arc tube, each electrode being supported on metal rod 4 which is welded to molybdenum ribbon 5 which, in turn, is welded to external lead-in wire 6. Press seal 2 completely embeds ribbon 5 and provides the support for rod 4.

Disposed on the exterior surface of the cup-shaped ends of envelope 1 is a heat reflecting coating 7. Coating 7 generally surrounds electrode 3 and extends onto press seal 2. The coating comprises $ZrO_2$ and $ZrB_2$ the addition of $ZrB_2$ considerably improving the adhesion of the coating to the quartz.

In a specific example, 125 grams of powdered $ZrO_2$, 3 grams of powdered $ZrB_2$ and 3.2 grams of submicron powdered alumina were dispersed in 200 milliliters of isopropyl alcohol. The specific gravity of this coating suspension was about 1.9. Each end of sealed envelope 1 was dipped into the suspension up to about or slightly beyond the height of electrode 3 to form coating 7 thereon. The coating was then removed from the end of press seal 2 and then fired at a temperature of 550° to 800°C in order to improve the adhesion thereof.

X-ray diffraction analysis of the bonded coating revealed a drop in $ZrB_2$ intensity and an increase in $ZrO_2$ intensity in comparison with the unfired coating. This suggests that the $ZrB_2$ is being reduced and that the Zr metal thereby freed up is oxidized during the firing, thereby increasing the $ZrO_2$ concentration while reducing the $ZrB_2$ concentration. The boron thus formed goes into a borosilicate glassy phase of the general form $(x)SiO_2(x-a)B_2O_3$ at the quartz interface which plays a role in the bonding mechanism. Scanning electron microscope microphotographs of the interface between coating 7 and quartz envelope 1 confirms the formation of the borosilicate glassy phase.

At a suspension specific gravity of about 1.9, the thickness of coating 7 was about 150 microns, which is satisfactory for the purpose of this invention. If the coating is too thin, the heat reflectivity thereof is inadequate. If the coating is too thick, cracking thereof can result.

The ratio of $ZrO_2$ to $ZrB_2$ in the coating suspension should be between about 30:1 and 250:1. When the $ZrB_2$ content is at a lesser ratio than about 250:1 there is insufficient $ZrB_2$ present to improve adhesion. At greater ratios than about 30:1, the $ZrB_2$ discolors the coating and reduces the visible light reflectivity thereof, thereby reducing lamp efficiency.

When the coating is fired at temperatures less than about 550°C, the adhesion thereof to the arc tube is inadequate to prevent rub-off.

The purpose of the submicron alumina in the coating suspension is to increase the strength of the unfired coating.

When the arc tube is supported by metal supports 8 clamped on press seal 2, there should be a separation between clamp 8 and coating 7. The reason for this is to prevent electrolysis that can occur as a result of a potential difference between electrode 3 and coating 7, since coating 7 has some electrical conductivity at normal operating temperatures and since clamp 8 is usually a part of the electrical circuit of the lamp.

Lamps of this invention that have been life tested have shown no evidence of deleterious strains in the quartz as a consequence of the reaction of the $ZrB_2$ with quartz.

I claim:

1. The method of forming a heat reflective coating on the end of a metal halide discharge arc tube made of high silica glass comprising the steps of applying a coating on said end of a suspension including $ZrO_2$ and $ZrB_2$, the ratio of $ZrO_2$ to $ZrB_2$ in the suspension being between about 30:1 and 250:1, drying said coating and firing said coating at a temperature of about 550° to 800°C.

* * * * *